(No Model.)
J. E. MILLER.
SHAFT COUPLING.
No. 245,652. Patented Aug. 16, 1881.
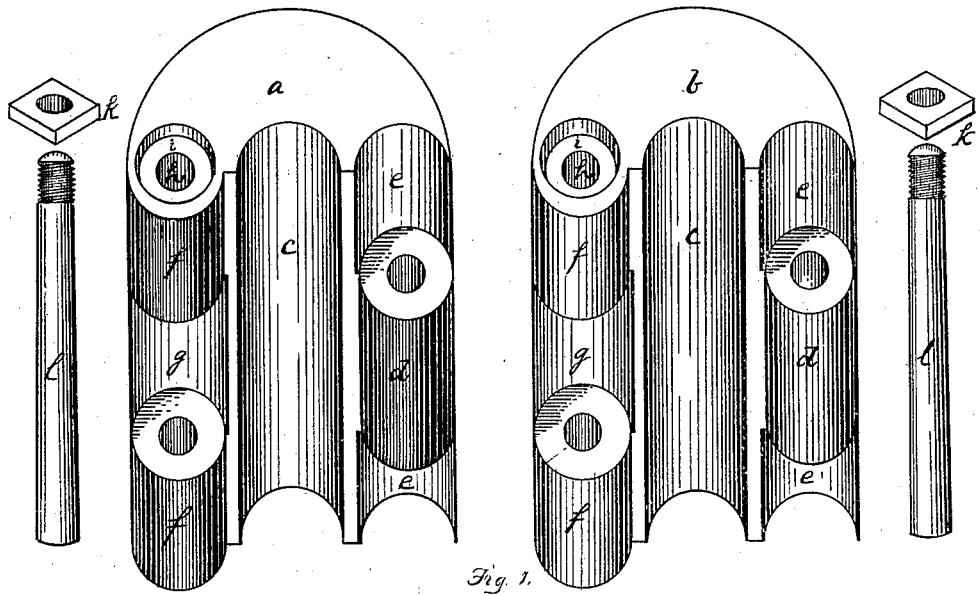
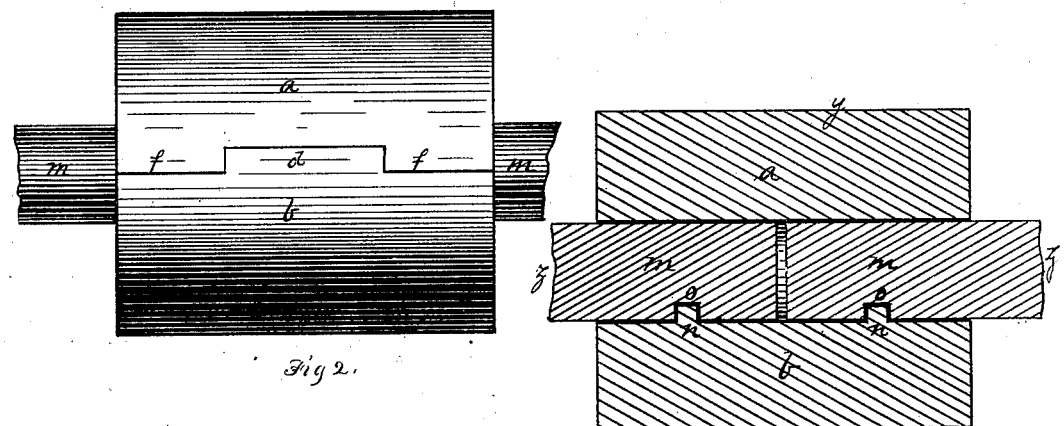
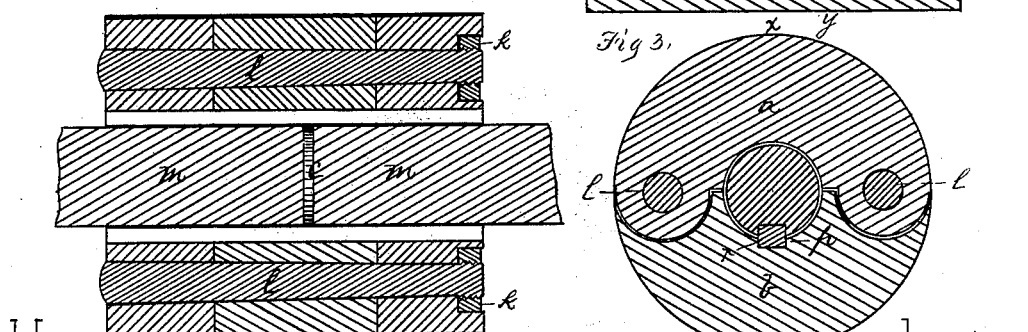
Witnesses
Jno K Smith
J. A. Carlin
Inventor
John Ernest Miller
by Bakewell & Kerr
his attys

UNITED STATES PATENT OFFICE.

JOHN E. MILLER, OF PITTSBURG, PENNSYLVANIA.

SHAFT-COUPLING.

SPECIFICATION forming part of Letters Patent No. 245,652, dated August 16, 1881.

Application filed April 11, 1881. (No model.)

*To all whom it may concern:*

Be it known that I, JOHN ERNEST MILLER, of Pittsburg, in the county of Allegheny and State of Pennsylvania, have invented a new and useful Improvement in Shaft-Couplings; and I do hereby declare the following to be a full, clear, and exact description thereof.

My invention relates to shaft-couplings; and it consists in an improved form, in which, dispensing with all solid rings for uniting the detachable parts of the coupling, and with the complicated constructions heretofore in common use, I construct my coupling of two longitudinal halves, united at the edges by tapered keys or pins passing through intermeshed lugs on each side of the central bore, in which the ends of the shafts are placed.

To enable others skilled in the art to make and use my invention, I will now describe it by reference to the accompanying drawings, in which—

Figure 1 is a perspective view of the various parts of my improved coupling taken apart and laid side by side. Fig. 2 is a side view of the same put together and coupling two shafts. Fig. 3 is a longitudinal vertical section on $x\ x$, Fig. 4. Fig. 4 is a cross-section on $y\ y$, Fig. 3, both of the central lugs being on the upper half. Fig. 5 is a longitudinal section on $z\ z$, Fig. 3.

Like letters of reference indicate like parts in each.

My improved coupling is composed of two longitudinal halves, $a\ b$, each having a longitudinal central groove, $c$, which, when the halves are put together, form the central bore for containing the ends of the shafts that are to be united. Each half is provided with a half-round or cylindrical-shaped lug, $d$, and two half-round or cylindrical-shaped grooves or recesses, $e$, on one side, and two similar lugs, $f\ f$, and one similar groove, $g$, on the other side. The lugs $d\ f\ f$ are counterparts of the grooves $g\ e\ e$, so that when the two halves are placed together, as in Fig. 2, the lugs fit nicely within the grooves.

A hole, $h$, is drilled longitudinally through the lugs on both sides, as shown in Fig. 5, and one end of the coupling is countersunk, as at $i$, at the end of each hole $h$, to receive the nut $k$, which is to be screwed on the end of the pin $l$, designed to extend through said hole.

The two parts $a$ and $b$ are secured together by the tapered pins or keys $l$, which are preferably screw-threaded at their smaller ends, and when in place are secured by the nuts $k$, which, as stated, enter the recesses $i$, so as not to project beyond the end of the coupling.

The nuts and threads may be dispensed with, and holes may be punched in the ends of the pins and small keys inserted therein to secure them in place; or the pins may be plain and be used without fastening devices.

The central bore, $c$, should be made slightly smaller than the shafts it is designed for use with—say, for instance, one sixty-fourth of an inch less in diameter. This will cause the halves $a\ b$, when drawn together by driving in the tapered keys $l$, to bite, bind, or clamp upon the shafts $m\ m$, and so make a firm and secure coupling; but to make greater provision against the slipping of the shafts I prefer to make the coupling with dowels or pins $n$, fitting into recesses $o$, Fig. 3, in the shafts $m$; or to make a recess, $p$, Fig. 4, equally in the shaft and coupling, and insert a key, $r$, therein. If a longer coupling is needed, I increase the number of intermeshing lugs, and in all my couplings the said lugs, extending alternately from opposite sides, are so arranged that the draft shall be on the pin at each end. The wedge-shaped pins $l$ have sufficient draft to bring the halves snugly together.

The main advantage of my invention is that it can be taken clear off of the shafts by simply loosening the pins, and dispenses with all combining-rings, wedge-collars, and other intricate devices, which cannot be taken off except over the ends of the shaft. It is also easy to put on, cheap in construction, simple in use, and reliable in operation.

What I claim as my invention, and desire to secure by Letters Patent, is—

A shaft-coupling consisting of two longitudinal halves, having a central bore for receiving the ends of the shafts, said halves being secured together by tapered pins or keys extending longitudinally through lugs projecting alternately from the sides of the opposite halves, and arranged in line with each other, substantially as and for the purposes described.

In testimony whereof I have hereunto set my hand.

JOHN ERNEST MILLER.

Witnesses:
T. B. KERR,
JAMES H. PORTE.